(12) United States Patent
Wamprecht et al.

(10) Patent No.: US 10,435,501 B2
(45) Date of Patent: Oct. 8, 2019

(54) THERMOPLASTIC POLYURETHANES, PRODUCTION AND USE THEREOF

(71) Applicant: Covestro Deutschland AG, Leverkusen (DE)

(72) Inventors: Christian Wamprecht, Neuss (DE); Christoph Gürtler, Köln (DE)

(73) Assignee: Covestro Deutschland AG, Leverkusen (DE)

( * ) Notice: Subject to any disclaimer, the term of this patent is extended or adjusted under 35 U.S.C. 154(b) by 0 days.

(21) Appl. No.: 15/302,847

(22) PCT Filed: Apr. 1, 2015

(86) PCT No.: PCT/EP2015/057142
§ 371 (c)(1),
(2) Date: Oct. 7, 2016

(87) PCT Pub. No.: WO2015/155084
PCT Pub. Date: Oct. 15, 2015

(65) Prior Publication Data
US 2017/0081463 A1    Mar. 23, 2017

(30) Foreign Application Priority Data
Apr. 7, 2014  (DE) .................... 10 2014 004 926

(51) Int. Cl.
| *C08G 18/54* | (2006.01) |
| --- | --- |
| *C08G 18/66* | (2006.01) |
| *C08G 18/08* | (2006.01) |
| *C08G 18/32* | (2006.01) |
| *C08G 18/48* | (2006.01) |
| *C08G 18/76* | (2006.01) |

(52) U.S. Cl.
CPC ....... *C08G 18/546* (2013.01); *C08G 18/0895* (2013.01); *C08G 18/3206* (2013.01); *C08G 18/48* (2013.01); *C08G 18/667* (2013.01); *C08G 18/7671* (2013.01)

(58) Field of Classification Search
CPC .............. C08G 18/546; C08G 18/0895; C08G 18/3206; C08G 18/48; C08G 18/667; C08G 18/7671
See application file for complete search history.

(56) References Cited

U.S. PATENT DOCUMENTS

| 3,575,930 | A |   | 4/1971 | Dinbergs |  |
|---|---|---|---|---|---|
| 3,642,942 | A | * | 2/1972 | Castner et al. | .......... C08G 2/30 524/147 |
| 3,682,845 | A |   | 8/1972 | Longley et al. |  |
| 3,718,622 | A | * | 2/1973 | Camilleri | .......... C08G 18/2825 525/440.01 |
| 2004/0097961 | A1 |   | 5/2004 | Burbank et al. |  |
| 2006/0205915 | A1 | * | 9/2006 | Groer | ................. C08G 18/4825 528/85 |
| 2015/0337070 | A1 | * | 11/2015 | Muller | .................... C08G 2/06 528/234 |

FOREIGN PATENT DOCUMENTS

| EP |   | 0046538 | A2 |   | 3/1982 |  |
|---|---|---|---|---|---|---|
| WO |   | WO 2004/096746 | A1 |   | 11/2004 |  |
| WO |   | WO-2014095861 | A2 | * | 6/2014 | ............... C08G 2/06 |

OTHER PUBLICATIONS

International Search Report and Written Opinion for International Application No. PCT/EP2015/057142, European Patent Office, dated Jul. 7, 2015.

* cited by examiner

*Primary Examiner* — Michael L Leonard
(74) *Attorney, Agent, or Firm* — Drinker Biddle & Reath LLP

(57) ABSTRACT

The invention also relates to thermoplastic polyurethanes and to a method for the production and use thereof.

15 Claims, No Drawings

THERMOPLASTIC POLYURETHANES, PRODUCTION AND USE THEREOF

CROSS-REFERENCE TO RELATED APPLICATIONS

This application is a U.S. national stage application, filed under 35 U.S.C. § 371, of PCT/EP2015/057142, which was filed on Apr. 1, 2015, and which claims priority to German Patent Application No. DE 102014004926.4, which was filed on Apr. 7, 2014, the contents of each of which are incorporated by reference into this specification.

The present invention relates to thermoplastic polyurethanes, to a process for producing these, and to use of these.

Because they have good elastomer properties and thermoplastic processability, thermoplastic polyurethanes (TPUs) are of great industrial importance. An overview of the production, properties and applications of TPUs is set out by way of example in Kunststoff Handbuch [Plastics Handbook] [G. Becker, D. Braun], volume 7 "Polyurethane" [Polyurethanes], Carl Hanser Verlag, Munich, Vienna, 1983. Other overviews of TPUs are found in Kunststoffe [Plastics] 68 (1978), pages 819 to 825 and Kautschuk, Gummi, Kunststoffe [Natural rubber, rubber, plastics] 35 (1982), pages 568 to 584.

TPUs are mostly composed of linear polyols (macrodiols), e.g. polyester diols, polyether diols or polycarbonate diols, organic diisocyanates and short-chain, mostly dihydric alcohols (chain extenders). They can be produced continuously or batchwise. The best known production processes are the belt process (GB-A 1 057 018) and the extruder process (DE-A 19 64 834).

The thermoplastically processable polyurethane elastomers can be constructed either in steps (prepolymer process) or via simultaneous reaction of all of the components in one stage (one-shot process).

There are many different techniques for processing TPUs, e.g. injection moulding, extrusion, calendering, powder slush process. It is thus possible to produce mouldings, profiles, films, foils, skins, etc. for a very wide variety of applications, and each of these uses places specific requirements on the polymer material. The market is therefore constantly demanding TPUs with new or improved properties for a variety of applications.

It was therefore an object of the present invention to provide thermoplastic polyurethanes with improved properties.

Surprisingly, the said object was achieved via thermoplastic polyurethanes based on polyoxymethylene block copolymers, in particular on paraformaldehyde-based polyols.

The present invention provides thermoplastic polyurethanes obtainable from the reaction of the following components:
   a) at least one organic diisocyanate,
   b) compounds which are reactive towards isocyanates and which in each case have number-average molar masses of from 500 to 10 000 g/mol, where the number-average functionality of the entirety of the components under b) is from 1.8 to 2.5, and
   c) chain extenders in each case having number-average molar masses of from 60 to 490 g/mol, where the number-average functionality of the entirety of the chain extenders under c) is from 1.8 to 2.5, in the presence of
   d) optionally catalysts,
   e) optionally monofunctional chain terminators,
   f) optionally auxiliaries and/or additional materials,
   where component b) comprises at least one polyol based on paraformaldehyde (b1).

The invention further provides a process for the production of the thermoplastic polyurethanes of the invention via reaction of
   a) at least one organic diisocyanate with
   b) compounds which are reactive towards isocyanates and which in each case have number-average molar masses of from 500 to 10 000 g/mol, where the number-average functionality of the entirety of the components under b) is from 1.8 to 2.5, and
   c) chain extenders which have groups reactive towards isocyanates and which in each case have number-average molar masses of from 60 to 490 g/mol, where the number-average functionality of the entirety of the chain extenders under c) is from 1.8 to 2.5, preferably from 1.8 to 2.2, in the presence of
   d) optionally catalysts, and
   e) optionally monofunctional chain terminators, and
   f) optionally auxiliaries and/or additional materials,
   where component b) comprises at least one polyol based on paraformaldehyde (b1).

The hardness of the TPUs of the invention can be adjusted via relatively wide variation of the molar ratios of the structural components a) to c).

The molar ratio of groups that are reactive towards isocyanates in components b) and c) to isocyanate groups in component a) is preferably from 0.8:1.0 to 1.2:1.0, particularly preferably from 0.9:1.0 to 1.1:1.0.

The thermoplastic polyurethanes of the invention are produced by the known processes, usually in the one-shot or prepolymer process on a belt system or in a reactive extruder. The components a) to c) involved in the reaction here are combined in the presence of optionally d), e) and f), altogether or in a prescribed sequence, and reacted. In the case of the reactive extruder process, the structural components a) to c) are introduced in the presence of d) and optionally e) and f) individually in succession or altogether in the form of a mixture into the extruder, e.g. at temperatures of from 100° to 250° C., preferably from 150° to 230° C., and reacted. The resultant TPU is discharged from the extruder, cooled, and granulated.

Known processes, such as injection moulding, extrusion, calendering, or sintering, can be used, for example, for the processing of the TPUs of the invention, which are usually used in the form of granulated material or of powder, to give plastics parts such as films, skins, coatings and foils.

Injection moulding and extrusion of TPUs are well known and widely described. Injection-moulded or extruded plastics parts in this application are any of the forms of components, articles and shapes that can be produced by means of injection moulding or extrusion. The processing by injection moulding or by extrusion can take place in conventional systems known to the person skilled in the art. The processing temperatures for the production of the plastics part are usually from 140° to 240° C., and adjustment can be achieved here to a specific range of available processing temperatures via targeted molar mass adjustment during the production of the TPU by way of the ratio of groups reactive towards isocyanate groups in components b) and c) to isocyanate groups in component a), and/or via the use of monofunctional chain terminators e).

The expression plastics parts that can be produced from the TPUs of the invention means by way of example foils, door grips and door seals, rotary buttons and control buttons, rollers, door storage compartments, armrests, tool grips, impact-absorbing inserts, hoses, cable sheathing, airbag covers, instrument panels, bumper strips, automobile antennas, blinds and drinks holders.

Components a) to f) usually used in the production of the TPUs of the invention are described by way of example below:

Organic diisocyanates a) used are conventional aromatic, aliphatic and/or cycloaliphatic diisocyanates. Individual examples that may be mentioned are:

Aromatic diisocyanates, for example tolylene 2,4-diisocyanate, mixtures of tolylene 2,4-diisocyanate and tolylene 2,6-diisocyanate, diphenylmethane 4,4'-diisocyanate, diphenylmethane 2,4'-diisocyanate and diphenylmethane 2,2'-diisocyanate, mixtures of diphenylmethane 2,4'-diisocyanate and diphenylmethane 4,4'-diisocyanate, 4,4'-diisocyanato-1, 2-diphenylethane, naphthylene 1,5-diisocyanate, and urethane-modified liquid diphenylmethane 4,4'-diisocyanates and diphenylmethane 2,4'-diisocyanates. It is preferable to use, as aromatic organic diisocyanates, diphenylmethane diisocyanate isomer mixtures with >96% by weight diphenylmethane 4,4'-diisocyanate content and in particular diphenylmethane 4,4'-diisocyanate and naphthylene 1,5-diisocyanate. The diisocyanates mentioned can be used individually or in the form of mixtures with one another. They can also be used together with up to 15% by weight (based on the total quantity of diisocyanate) of a polyisocyanate, for example triphenylmethane 4,4',4"-triisocyanate or polyphenyl polymethylene polyisocyanates.

Other diisocyanates a) that can be used are aliphatic and cycloaliphatic diisocyanates. Mention may be made by way of example of hexamethylene diisocyanate, isophorone diisocyanate, cyclohexane 1,4-diisocyanate, 1-methylcyclohexane 2,4-diisocyanate and 1-methylcyclohexane 2,6-diisocyanate, and also the corresponding isomer mixtures and dicyclohexylmethane 4,4'-, 2,4'- and 2,2'-diisocyanate, and also the corresponding isomer mixtures. It is preferable that the aliphatic organic diisocyanate used is composed of at least 50% by weight, preferably 75% by weight and particularly preferably 100% by weight, of hexamethylene 1,6-diisocyanate.

Compounds b) that can be used that are reactive towards isocyanates are, alongside the paraformaldehyde-based polyols to be used according to the invention, well-known polyhydroxy compounds with number-average molar masses Mn of from 500 to 10 000 g/mol, preferably from 600 to 7500 g/mol and particularly preferably from 800 to 5000 g/mol with preferred number-average functionality of from 1.8 to 2.5, particularly from 1.8 to 2.2 and very particularly from 1.9 to 2.1, where the number-average functionality of the entirety of the components in b) is from 1.8 to 2.5, examples being polyester polyols, polyether ester polyols, polyether polyols, polyether carbonate polyols, caprolactone polyols, and polycarbonate polyols.

Suitable polyester polyols can by way of example be produced from dicarboxylic acids having from 2 to 12 carbon atoms, preferably from 4 to 6 carbon atoms, and from polyhydric alcohols. The following can by way of example be used as dicarboxylic acids: Aliphatic dicarboxylic acids, for example succinic acid, maleic acid, glutaric acid, adipic acid, suberic acid, azelaic acid and sebacic acid and aromatic dicarboxylic acids, for example phthalic acid, isophthalic acid and terephthalic acid, and the possible cyclic anhydrides of the dicarboxylic acids mentioned. The dicarboxylic acids can be used individually or in the form of mixtures, e.g. in the form of a succinic, glutaric and adipic acid mixture. For the production of the polyester diols it can sometime be advantageous to use, instead of the dicarboxylic acids, the corresponding dicarboxylic acid derivatives, for example carboxylic diesters having from 1 to 4 carbon atoms in the alcohol moiety, carboxylic anhydrides or acyl chlorides. Examples of polyhydric alcohols are glycols having from 2 to 10, preferably from 2 to 6, carbon atoms, for example ethylene glycol, diethylene glycol, 1,2- and 1,3-propanediol, 1,4-butanediol, 1,5-pentanediol, 1,6-hexanediol, 1,10-decanediol, 2,2-dimethyl-1,3-propanediol, 3-methyl-1,5-pentanediol and dipropylene glycol. Production of the polyester polyols can optionally also make concomitant use of proportions of from 0 to 30 mol %, based on the number of moles of diols used, of alcohols having more than 2 OH groups. An example of these polyhydric alcohols is trimethylolpropane or glycerol. The polyhydric alcohols can be used alone or optionally in a mixture with one another, as required by the properties desired. Other suitable materials are esters of carbonic acid with the diols mentioned, in particular those having from 4 to 6 carbon atoms, for example 1,4-butanediol or 1,6-hexanediol, condensates of hydroxycarboxylic acids, for example hydroxycaproic acid and polymerisation products of lactones, optionally by way of example of substituted caprolactones. The polyester diols preferably used are ethanediol polyadipates, 1,4-butanediol polyadipates, ethanediol 1,4-butanediol polyadipates, 1,6-hexanediol neopentyl glycol polyadipates, 1,6-hexanediol 1,4-butanediol polyadipates and polycaprolactones. The average molar masses Mn of the polyester diols are from 500 to 5000, preferably from 700 to 4200 g/mol, and they can be used individually or in the form of mixtures with one another.

Suitable polyether polyols can be produced by reacting one or more alkylene oxides having from 2 to 4 carbon atoms in the alkylene moiety with a starter molecule which preferably has two bound active hydrogen atoms. The following may be mentioned as examples of alkylene oxides: ethylene oxide, 1,2-propylene oxide, epichlorohydrin, 1,2-butylene oxide and 2,3-butylene oxide. It is preferable to use ethylene oxide, 1,2-propylene oxide and mixtures of 1,2-propylene oxide and ethylene oxide. The alkylene oxides can be used individually, in alternating succession or in the form of mixtures. Examples of starter molecules that can be used are: water, amino alcohols, for example N-alkyldiethanolamines, for example N-methyldiethanolamine, and diols, for example ethylene glycol, propylene 1,2-glycol, propylene 1,3-glycol, 1,4-butanediol and 1,6-hexanediol. It is optionally also possible to use mixtures of starter molecules. Other suitable polyether diols are the hydroxylated polymerisation products of tetrahydrofuran. It is also possible to use proportions of from 0 to 30% by weight of trifunctional polyethers, based on the bifunctional polyethers, but the quantity of these is to be at most that which gives a thermoplastically processable product. The number-average molar masses Mn of the substantially linear polyether diols is from 500 to 10 000 g/mol, preferably from 700 to 4200 g/mol. They can be used either individually or else in the form of mixtures with one another or in a mixture with the other polyols described.

Suitable polycarbonate polyols can be produced by transesterifying low-molecular-weight carbonic esters, for example dimethyl carbonate, diethyl carbonate or diphenyl carbonate, with suitable polyols, preferably diols, with catalysis by appropriate transesterification catalysts, for example titanium tetraisopropylate, with elimination of the corresponding monoalcohols, e.g. methanol, ethanol or phenol. Examples of suitable diols for the transesterification of low-molecular-weight carbonic esters are the diols mentioned above for the production of the polyester polyols or else short-chain polyether diols, e.g. polytetrahydrofuran with molar mass Mn about 250 g/mol. Polycarbonate polyols having particularly good suitability are based on 1,6-hexanediol, 1,4-butanediol, 3-methyl-1,5-pentanediol, or a mixture of these diols. The number-average molar masses Mn of the substantially linear polycarbonate polyols are from 500 to 6000 g/mol, preferably from 800 to 4000 g/mol.

Suitable polyether carbonate polyols can preferably be produced either via copolymerisation of alkylene oxides with carbon dioxide with catalysis by specific catalysts, e.g. double metal cyanide catalysts, or via transesterification of low-molecular-weight carbonic esters with polyether diols, as described above. The number-average molar masses Mn of the substantially linear polycarbonate polyols are from 500 to 6000 g/mol, preferably from 800 to 4000 g/mol.

The polyoxymethylene block copolymers essential to the invention, in particular paraformaldehyde-based polyols b1), are preferably produced via a catalytic addition reaction of alkylene oxides, and also optionally other comonomers (e.g. $CO_2$) onto at least one polymeric formaldehyde starter compound which has at least one terminal hydroxy group, in the presence of a double metal cyanide (DMC) catalyst, where (i) in a first step, the DMC catalyst is activated in the presence of the polymeric formaldehyde starter compound, by adding a partial quantity (based on the total quantity of the quantity of alkylene oxides used for the activation and polymerisation processes) of one or more alkylene oxides to activate the DMC catalyst ("activation"), (ii) in a second step, one or more alkylene oxides, and also optionally other comonomers, are added to the mixture resulting from step (i); the alkylene oxides used in step (ii) here can be the same as or different from the alkylene oxides used in step (i) ("polymerisation"), where the activation of the DMC catalyst in the first step (i) takes place at an activation temperature $T_{act}$ of from 20° to 120° C.

DMC catalysts are in principle known from the prior art for the homopolymerisation of epoxides (see for example U.S. Pat. Nos. 3,404,109 A, 3,829,505 A, 3,941,849 A and 5,158,922 A). DMC catalysts described for example in U.S. Pat. No. 5,470,813 A, EP 700 949 A, EP 743 093 A, EP 761 708 A, WO 97/40086 A, WO 98/16310 A and WO 00/47649 A have very high activity in the homopolymerisation of epoxides and permit production of polyether polyols at very low catalyst concentrations (25 ppm or less). The high-activity DMC catalysts described in EP-A 700 949 are a typical example, comprising not only a double metal cyanide compound (e.g. zinc hexacyanocobaltate(III)) and an organic ligand (e.g. tert-butanol) but also a polyether with number-average molar mass $M_n$ greater than 500 g/mol.

The quantity used of the DMC catalyst is mostly smaller than 1% by weight, preferably smaller than 0.5% by weight, particularly preferably smaller than 500 ppm and in particular smaller than 300 ppm, based in each case on the weight of the polyether carbonate polyol.

Suitable polymeric formaldehyde starter compounds are in principle those oligomeric and polymeric forms of formaldehyde which have at least one terminal hydroxy group for the reaction with the alkylene oxides and with the optional other comonomers. The expression "terminal hydroxy group" in particular means a terminal hemiacetal functionality, this being a structural feature produced by way of the polymerisation of the formaldehyde. By way of example, the starter compounds can be linear oligomers and polymers of formaldehyde having the general formula HO—$(CH_2O)_n$— H, where n is an integer ≥2 and where polymeric formaldehyde typically has a number n of repeating units that is ≥8 and ≤100.

It is known that the presence of small traces of water is sufficient to polymerize formaldehyde. The material that forms in aqueous solution is therefore, depending on the concentration and temperature of the solution, a mixture of oligomers and polymers of different chain lengths in equilibrium with molecular formaldehyde and formaldehyde hydrate. The material known as paraformaldehyde precipitates here as a white, poorly soluble solid from the solution and is generally a mixture of linear formaldehyde polymers where the number of repeating oxymethylene units n is from 8 to 100. It is preferable to use this latter mixture.

The polyoxymethylene block copolymers suitable for the TPUs of the invention are polymeric compounds which comprise at least one polyoxymethylene block, and also at least one additional oligomeric block made of alkylene oxides or alkylene oxides with other comonomers (e.g. polyoxyalkylene blocks or polyoxyalkylene carbonate blocks), and which preferably do not exceed a molecular weight within the four-digit range.

The polyoxymethylene block copolymers provide a number of advantages over existing polymers. By way of the length of the polyoxymethylene blocks in comparison with the other oligomeric blocks, it is possible to achieve targeted control of certain physical properties, for example glass transition temperatures, melting ranges, viscosities and solubilities. The synthetically variable segment structure of the resultant polyoxymethylene block copolymers moreover permits provision of tailored "hard-soft" segments at a molecular level.

The degree of semicrystallinity of the polyoxymethylene block copolymers of the invention is typically lower than that of polyoxymethylene homopolymers of the same molecular weight; the glass transition temperatures, melting points and viscosities are also lower. Chemical and thermal stability are markedly higher. The polyoxymethylene block copolymers used generally moreover have good solubilities in various solvents, and can mostly be melted easily and without loss of mass or are liquid at low temperatures. In comparison with polyoxymethylene homopolymers, the polyoxymethylene block copolymers exhibit markedly better processability.

In comparison with polyether polyols of the same molecular weight, the proportion of polyoxyalkylene units produced from the corresponding alkylene oxides is reduced by an amount corresponding to the polyoxymethylene content, with a resultant contribution to advantageous cost-effectiveness of the product.

Other compounds c) (known as chain extenders) that can be used that are reactive towards isocyanates are well-known polyhydroxy compounds and/or polyamine compounds with number-average molar masses of from 60 to 490 g/mol, preferably from 60 to 400 g/mol and particularly preferably from 62 to 300 g/mol, preferably where the number-average functionalities of the entirety of chain extenders c) are from 1.8 to 2.5, preferably from 1.8 to 2.2 and particularly preferably from 1.9 to 2.1. Examples of suitable polyamine compounds are diamines, for example (cyclo)aliphatic diamines, for example, isophoronediamine, ethylenediamine, 1,2-propylenediamine, 1,3-propylenediamine, N-methylpropylene-1,3-diamine, N,N'-dimethylethylenediamine and aromatic diamines, for example 2,4-tolylenediamine, 2,6-tolylenediamine, 3,5-diethyl-2,4-tolylenediamine or 3,5-diethyl-2,6-tolylenediamine or primary mono-, di-, tri- or tetraalkyl-substituted 4,4'-diaminodiphenylmethanes. It is also possible to use amino alcohols, e.g. N-2-(methylamino)ethanol or 3-(methylamino)-1-propanol as chain extenders c). It is preferable to use, as chain extenders c), one or more compounds from the group of the aliphatic diols having from 2 to 14 carbon atoms, for example ethanediol, 1,2-propanediol, 1,3-propanediol, 1,4-butanediol, 2,3-butanediol, 1,5-pentanediol, 3-methyl-1,5-pentanediol, 1,6-hexanediol, 1,8-octanediol, 1,10-decanediol, 1,12-dodecanediol, diethylene glycol, dipropylene glycol, 1,4-cyclohexanediol, 1,4-dimethanolcyclohexane and neopentyl glycol. Other suitable compounds, however, are diesters of terephthalic acid with glycols having from 2 to 4 carbon atoms, e.g. bis(ethylene glycol) terephthalate or bis(1,4-butanediol) terephthalate, hydroxyalkylene ethers of hydroquinone, for example 1,4-di(β-hydroxyethyl)hydroquinone, and ethoxylated bisphenols, for example 1,4-di(β-hydroxyethyl)bisphenol A. The diols mentioned can also be reacted with various molar quantities of ε-caprolactone in a ring-opening reaction, giving corresponding chain extenders with number-average molar masses up to 490 g/mol. Chain extenders particularly preferably used are ethanediol, 1,4-butanediol, 1,6-hexanediol, 1,4-dimethanolcyclohexane, 1,4-di(β-hydroxyethyl)hydroquinone and 1,4-di(β-hydroxyethyl)bisphenol A and reaction products of these with ε-caprolactone. It is also possible to add, alongside these, relatively small quantities, up to 10% by weight, based on the total quantity of component c), of triols, e.g. trimethylolpropane or glycerol.

Suitable catalysts d) can optionally be used in the first and/or second step of the process of the invention. Catalysts suitable for the production of TPUs are the tertiary amines that are conventional and known in the prior art, e.g. triethylamine, dimethylcyclohexylamine, N-methylmorpholine, N,N'-dimethylpiperazine, 2-(dimethylaminoethoxy)ethanol, diazabicyclo[2.2.2]octane, and also organometallic compounds, for example titanium compounds, for example titanium tetraisopropylate, titanium tetrabutylate, titanium-chelate complex compounds, iron compounds, for example iron(III) acetylacetonate, zirconium compounds, for example zirconium-chelate complex compounds, or tin compounds, for example tin diacetate, tin dioctanoate, tin dilaurate or the dialkyltin salts of aliphatic carboxylic acids, for example dibutyltin diacetate or dibutyltin dilaurate. Preferred catalysts are organometallic compounds, in particular titanium compounds, iron compounds, zirconium compounds and tin compounds.

The total quantity of catalysts in the TPUs is generally about 0 to 5% by weight, preferably 0.0001 to 1% by weight and particularly preferably 0.0002 to 0.5% by weight.

Chain terminators e) used can be compounds which have only one group reactive towards the isocyanates a), for example monoalcohols, for example ethanol, 1-propanol, 2-propanol, 1-butanol, 1-hexanol, 1-octanol or stearyl alcohol. These chain terminators can be used for controlled adjustment of molecular weight, melt viscosity and therefore also the rheology of the TPUs.

Other auxiliaries and/or additional materials 1) that can be used are conventional additives, for example surface-active substances, flame retardants, nucleating agents, lubricants and mould-release agents, dyes, pigments and fillers, inhibitors, stabilizers with respect to hydrolysis, light, heat, oxidation or discolouration, materials intended to prevent microbial degradation, and also reinforcing materials and plasticizers.

The TPUs of the invention are suitable for the plastics processing techniques known per se, for example injection moulding, extrusion, calendering, powder slush process, etc., and provide, in accordance with requirements, improved quality levels in the resultant products: by way of example in the case of mouldings, improved ultimate tensile strength and stiffness (modulus) are found in comparison with ether-based TPUs, and higher hardness.

The examples below are intended to provide further explanation of the invention.

EXAMPLES

Raw Materials Used:

Polyol 1: Acclaim® 2200N, polyether polyol based on propylene oxide with OH number 56 mg KOH/g, commercially available product from Bayer MaterialScience AG.

Polyol 2: Polyoxymethylene block copolymer based on paraformaldehyde (20% by weight), propylene oxide (66% by weight) and carbon dioxide (14% by weight) with OH number 53 mg KOH/g.

BDO: 1,4-butanediol

MDI: diphenylmethane 4,4'-diisocyanate

Tyzor® AA105: titanium catalyst from Dorf Ketal

Irganox® 1010: antioxidant from BASF AG

Licowax® C: mould-release agent from Clariant International Ltd.

Production of TPUs 1 to 3:

The respective polyol, 1% Licowax® C (based on the entire mixture) and 0.3% of Irganox® 1010 (based on polyol) according to Table 1 were used as initial charge in a reaction vessel and heated to 200° C., with stirring. 20 ppm of Tyzor® AA105 (based on polyol) were then added as catalyst. The total quantity of the MDI, heated to 60° C., was then added, with stirring, and the temperature in the reaction vessel decreased here to 165° C. After about 20 seconds the total quantity of 1,4-butanediol was added. After the reaction mixture had reached a temperature maximum of about 215° C., stirring was continued at a vigorous level (for about 7 to 8 sec.). The reaction mixture was then poured onto a coated metal sheet and post-conditioned for 30 minutes at 80° C. Cooling gave a cast TPU sheet.

Table 1 describes the reactive components used for the production of the TPUs and the proportions of these components.

TABLE 1

| Example | Polyol 1 [mol] | Polyol 2 [mol] | MDI [mol] | 1,4-Butanediol [mol] |
|---|---|---|---|---|
| 1 | 0.512 | 0.488 | 4.039 | 2.96 |
| 2 | 0 | 1 | 4.039 | 2.96 |
| 3* | 1 | 0 | 4.039 | 2.96 |

*not according to the invention

The resultant cast TPU sheets were chopped and granulated. The granulated material was processed in an Arburg Allrounder 470S injection-moulding machine in a temperature range from 180° to 230° C. and in a pressure range from 650 to 750 bar with an injection rate of from 10 to 35 cm³/s to give bars (mould temperature: 25° C.; bar size: 80×10×4 mm) and sheets (mould temperature: 25° C.; size: 125×50×2 mm).

The following were determined from the resultant TPUs: melt volume-flow rate (MVR) and mechanical values (100% modulus, 300% modulus, ultimate tensile strength, elongation at break and Shore A hardness).

Test Conditions:
1) Melt volume-flow rate (MVR)
The conditions for the MVR measurements, using an MP-D MVR device from Göttfert, were 190° C. with an applied weight of 10 kg (98N), with 5 min. of preheat time in accordance with ISO 1133.
2) Tensile test
The tensile test was carried out on S1 bars (corresponding to type 5 test specimen in accordance with EN ISO 527, punched out from injection-moulded sheets) in accordance with DIN 53455 with a tensile velocity of 200 mm/min.
3) Hardness
Hardness was measured in accordance with DIN 53505. Table 2 below lists the values measured.

TABLE 2

| TPU from | MVR [ml/10 min.] | 100% modulus [MPa] | 300% modulus [MPa] | Ultimate tensile strength [MPa] | Elongation at break [%] | Shore A hardness |
|---|---|---|---|---|---|---|
| Example 1 | 8.1 | 6.7 | 9.6 | 17.0 | 680 | 86 |
| Example 2 | 22.8 | 8.1 | 10.2 | 21.9 | 519 | 89 |
| Example 3* | 3.0 | 5.0 | 8.4 | 16.8 | 729 | 83 |

*-not according to the invention

Marked differences are found in the mechanical properties of the three TPUs produced. 100% modulus, 300% modulus and ultimate tensile strength are in each case higher for the TPUs 1 and 2 of the invention than for the TPU 3 not according to the invention. Although the quantity of chain extender is the same for all three TPUs, the Shore A hardness of the two TPUs of the invention is also higher than for the comparative TPU. The elongation at break values of the three TPUs are at a very high level and are adequate for all applications.

The invention claimed is:

1. A thermoplastic polyurethane obtainable from the reaction of the following components:
    a) at least one organic diisocyanate,
    b) compounds which are reactive towards isocyanates and which in each case have number-average molar masses of from 500 to 10 000 g/mol, where the number-average functionality of the entirety of the components under b) is from 1.8 to 2.5, and
    c) chain extenders in each case having number-average molar masses of from 60 to 490 g/mol, where the number-average functionality of the entirety of the chain extenders under c) is from 1.8 to 2.5,
    where component b) comprises at least one polyol based on paraformaldehyde (b1) as a polyoxymethylene block copolymer which is obtained via a catalytic addition reaction of at least one of ethylene oxide and propylene oxide onto at least one polymeric formaldehyde starter compound which has at least two terminal hydroxy groups, in the presence of a double metal cyanide catalyst, wherein the catalytic addition reaction includes an additional comonomer carbon dioxide, and wherein the polyoxymethylene block copolymer is based on 20% by weight paraformaldehyde, 66% by weight propylene oxide and 14% by weight of carbon dioxide, based on the weight of the polyoxymethylene block copolymer.

2. A process for the production of the thermoplastic polyurethanes according to claim 1, wherein the process comprises:
    reacting:
    a) at least one organic diisocyanate with
    b) compounds which are reactive towards isocyanates and which in each case have number-average molar masses of from 500 to 10 000 g/mol, where the number-average functionality of the entirety of the components under b) is from 1.8 to 2.5, and
    c) chain extenders which have groups reactive towards isocyanates and which in each case have number-average molar masses of from 60 to 490 g/mol, where the number-average functionality of the entirety of the chain extenders under c) is from 1.8 to 2.5,
    where component b) comprises at least one polyol based on paraformaldehyde (b1) as a polyoxymethylene block copolymer which is obtained via a catalytic addition reaction of at least one of ethylene oxide and propylene oxide onto at least one polymeric formaldehyde starter compound which has at least two terminal hydroxy groups, in the presence of a double metal cyanide catalyst.

3. A method comprising producing plastic parts utilizing the thermoplastic polyurethanes according to claim 1.

4. The thermoplastic polyurethane of claim 1, wherein the components are in the presence of catalysts.

5. The thermoplastic polyurethane of claim 1, wherein the components are in the presence of monofunctional chain terminators.

6. The thermoplastic polyurethane of claim 1, wherein the components are in the presence of auxiliaries and/or additional materials.

7. The thermoplastic polyurethane of claim 4, wherein the components are in the presence of monofunctional chain terminators.

8. The thermoplastic polyurethane of claim 4, wherein the components are in the presence of auxiliaries and/or additional materials.

9. The thermoplastic polyurethane of claim 7, wherein the components are in the presence of auxiliaries and/or additional materials.

10. The process for the production of the thermoplastic polyurethanes according to claim 1, wherein the reaction is in the presence of catalysts.

11. The process for the production of the thermoplastic polyurethanes according to claim 1, wherein the reaction is in the presence of monofunctional chain terminators.

12. The process for the production of the thermoplastic polyurethanes according to claim 1, wherein the reaction is in the presence of auxiliaries and/or additional materials.

13. The process for the production of the thermoplastic polyurethanes according to claim 10, wherein the reaction is in the presence of monofunctional chain terminators.

14. The process for the production of the thermoplastic polyurethanes according to claim 10, wherein the reaction is in the presence of auxiliaries and/or additional materials.

15. The process for the production of the thermoplastic polyurethanes according to claim 13, wherein the reaction is in the presence of auxiliaries and/or additional materials.

* * * * *